United States Patent
Cohen et al.

(10) Patent No.: US 6,953,512 B2
(45) Date of Patent: Oct. 11, 2005

(54) FACING FOR INSULATION AND OTHER APPLICATIONS

(75) Inventors: Lewis S. Cohen, Needham, MA (US); Sebastianus Franciscus Maria van Beukering, Gouda (NL)

(73) Assignee: Venture Tape Corp., Rockland, MA (US)

( * ) Notice: Subject to any disclaimer, the term of this patent is extended or adjusted under 35 U.S.C. 154(b) by 0 days.

(21) Appl. No.: 11/040,037

(22) Filed: Jan. 21, 2005

(65) Prior Publication Data
US 2005/0129896 A1 Jun. 16, 2005

Related U.S. Application Data

(62) Division of application No. 10/330,162, filed on Dec. 27, 2002.

(51) Int. Cl.$^7$ .............................................. B32B 31/18
(52) U.S. Cl. ..................... 156/248; 156/249; 156/265
(58) Field of Search ................................ 156/247–250, 156/254, 256, 264–266, 289, 185, 188, 212, 213, 215, 297, 299, 300, 71; 428/40.1, 40.9, 41.1, 343, 354, 420, 622, 624, 635, 480, 344, 355 R, 352

(56) References Cited

U.S. PATENT DOCUMENTS

| 3,058,704 | A | | 10/1962 | Bergstedt |
| 3,967,168 | A | | 6/1976 | Christensen |
| 4,503,189 | A | | 3/1985 | Igarashi et al. |
| 4,595,615 | A | | 6/1986 | Cohen |
| 4,606,957 | A | | 8/1986 | Cohen |
| 4,635,423 | A | * | 1/1987 | Ward .......................... 52/746.1 |
| 4,699,830 | A | | 10/1987 | White |
| 4,780,347 | A | | 10/1988 | Cohen |
| 4,842,908 | A | | 6/1989 | Cohen et al. |
| 4,867,818 | A | | 9/1989 | Morgan |
| 4,888,247 | A | | 12/1989 | Zweben et al. |
| 4,946,732 | A | | 8/1990 | Cohen et al. |
| 5,104,701 | A | | 4/1992 | Cohen et al. |
| 5,736,211 | A | * | 4/1998 | Fontanilla ................... 428/40.1 |
| 6,207,271 | B1 | | 3/2001 | Daroux et al. |
| 6,316,110 | B1 | | 11/2001 | Anzaki et al. |

OTHER PUBLICATIONS

*Venture Tape Corp., "VentureGuard™ Polymeric Insulation Facing Tape", Product No. 1576CW, Jan. 2002.
*http://www.dpia.org/glossary/p.html;2001.

* cited by examiner

Primary Examiner—Chris Fiorilla
Assistant Examiner—Sing P. Chan
(74) Attorney, Agent, or Firm—Wolf, Greenfield & Sacks, P.C.

(57) ABSTRACT

A method and material for covering exposed insulation surfaces to protect them from moisture and other environmental factors. The covering typically includes a first, exposed layer of a metal-containing foil, a second layer of a metal-containing foil, a layer of a polymer disposed between the first two layers of foil, a third layer of a metal-containing foil, and a second layer of polymer disposed between the second and third layers of foil. A layer of a pressure sensitive adhesive is applied to one of the exposed layers of foil, and the pressure sensitive adhesive layer is covered with a release liner prior to application. The foil provides the necessary moisture and weather seal while the polymer provides the necessary strength and puncture resistance. The overall thickness of the laminate typically is less than 100 microns, permitting it to be easily cut and manipulated at the job site while providing an effective, long lasting weather seal.

6 Claims, 4 Drawing Sheets

FACING FOR INSULATION AND OTHER APPLICATIONS

RELATED APPLICATIONS

This application claims the benefit under 35 U.S.C. §120 and is a divisional of U.S. application Serial No. 10/330,162 entitled "Facing For Insulation And Other Applications," filed on Dec. 27, 2002, which is incorporated herein by reference in its entirety.

FIELD OF THE INVENTION

This invention relates generally to insulation products for use with fluid conduits, such as pipes or ducts, and more particularly, to a facing material for use with insulation surrounding fluid conduits for providing a vapor barrier and a weather seal.

BACKGROUND OF THE INVENTION

Pipes or duct work in dwellings, commercial buildings and industrial plants are used for heating or air conditioning purposes and therefore carry fluids, such as heated or cooled air, or steam. In industrial applications, pipes or duct work also may carry chemicals or petroleum products or the like. Such pipes our duct work and associated heating or air conditioning units typically are covered with an exterior layer of insulation. The duct work typically is formed of aluminum or steel, while the pipes may be formed of any suitable material, such as copper, steel, aluminum, plastic, rubber or other like materials.

The insulation used to cover such pipes or duct work and associated heating and air conditioning units often includes fiberglass or mineral wool, foamed cellular glass or a rigid foam, covered by a jacket of foil or a layer of paper, such as kraft paper. Other layers of materials may be included in the insulation jacket, such as a layer of foil, a scrim, or a layer of polyester. Duct board is often used to cover duct work.

When such pipes or duct work are in a location exposed to weather or when they are in other environments where the exterior insulation surface is subject to degradation by moisture or the like, it is common to cover the insulation with a facing. This is particularly true for insulation having an exterior layer of paper or for duct board, (whether or not the surface is a metalized layer or a paper layer) to protect the insulation from moisture, sun, wind or other weather elements.

In one existing example, sheet metal cladding is applied to the exterior surface of the insulation. Such cladding typically is formed of aluminum, stainless steel, galvanized steel, or another like metal. This cladding has certain drawbacks including the fact that such cladding is very expensive and time consuming to install. In addition, metal cladding is not water or vapor tight or weatherproof because of joints, any repairs can be quite costly, prefabrication of the cladding is required off site, and metal cladding is very heavy and therefore difficult to handle.

Another existing solution is to cover the insulation with butyl rubber. However, this solution also has drawbacks including the fact that the butyl rubber does not perform well and tends to delaminate, particularly in extreme weather conditions. Butyl rubber also is very difficult to apply because it is messy to cut and form, and it is very heavy. Moreover, butyl rubber has been known to cause delamination of the outer surface of the insulation from the fiberglass or the wool disposed in the interior because of its weight and because of its lack of strength at elevated temperatures. A butyl rubber covering tends to have a poor appearance, and does not perform well at temperatures below zero degrees Fahrenheit or above 120° Fahrenheit and therefore should not be used in extreme weather environments where such exterior coverings are most desired and are often necessary. Butyl rubber also tends to creep, has a poor fire and smoke rating, and therefore is not UL listed. Finally, solvents are required to activate butyl rubber at temperatures below 45° F.

It is also known to cover insulation with thin layers of aluminum foil using a butyl rubber adhesive. However, such coverings have little or no puncture resistance and the adhesive layer has the same drawbacks noted above, including a tendency to run or ooze at elevated temperatures.

Scrim and mastics are also used to cover insulation. However, the use of such materials often is very labor intensive and requires a multiple step process. These products can only be applied during certain weather conditions, and it is very difficult to regulate the thickness of mastic to make it uniform. Consequently, such products have very limited applications, and generate a poor appearance.

Another known product is bitumen felt and netting. This product is very labor intensive to apply and is not recommended for exterior use. It also has a very poor fire rating, and is unsightly. Thus, its use is very limited.

In view of the foregoing, there exists a need for a material or facing for covering insulation, particularly exterior insulation, that is relatively inexpensive, easy to apply, provides a good appearance and provides the desired vapor and weather seal. There also is a need for a product which is fire resistant, has low maintenance costs and can be used in extreme temperature conditions.

SUMMARY OF INVENTION

This invention relates generally to a facing material for application to exposed surfaces of insulation or other like materials to provide a vapor seal and to protect the insulation from weather related damage. The facing of this invention overcomes the drawbacks of the prior art systems discussed above, since it is relatively inexpensive, is easy to apply, provides a good appearance, is easily cut and manipulated at the job site and provides a 100% vapor seal. The facing of this invention also can be applied and will maintain its integrity in extreme weather conditions and is very fire resistant. This invention also relates to a method for applying a facing to insulation.

In one aspect, the invention includes a facing for insulation. One embodiment of the facing includes a first layer of a metal-containing foil, a second layer of a metal-containing foil, a third layer of a metal-containing foil, and a first layer of a puncture resistant polymer film disposed between the first and second layers of foil, and a second layer of a puncture resistant polymer film disposed between the second and third layers of foil. In another embodiment, a layer of pressure sensitive adhesive is applied to the third layer of foil. In yet another embodiment, at least the first layer of metal-containing foil may be formed of aluminum. In another embodiment, at least the first layer of the puncture resistant polymer film is formed of polyester. A typically thickness for the metal-containing foil layers is about 9 microns, while a typical thickness of the puncture resistant polymer film layers is about 23 microns or greater, although the polymer film layers could be as thin as 5 microns.

In another aspect, a weather seal for use on exposed surfaces is disclosed. This weather seal includes a first layer of an aluminum foil, a second layer of a metal-containing foil, a third layer of a metal-containing foil, a first layer of a puncture resistant material disposed between the first layer of aluminum foil and the second layer of metal-containing foil, a second layer of a puncture resistant material disposed between the second and third layers of metal-containing foil and a layer of a pressure sensitive adhesive disposed on the third layer of metal-containing foil. In one embodiment, the first and second layers of puncture resistant material are formed of polyester. In another embodiment, the combined thickness of the weather seal is less than 100 microns. In another embodiment, the second and third layers of metal-containing foil are formed of a metalized foil.

In another aspect, a covering for exterior and interior insulation is disclosed. This covering includes a first layer of aluminum foil having a thickness in the range of from about 5 microns to about 50 microns, a first layer of polyester adhered to the first layer of aluminum foil with an adhesive, the polyester layer having a thickness greater than about 23 microns, a second layer of aluminum foil adhered to the first layer of polyester material by an adhesive, the second layer of aluminum foil having a thickness in the range of from about 5 microns to about 50 microns, a second layer of polyester material adhered to the second layer of aluminum foil by an adhesive, the second layer of polyester material having a thickness greater than about 23 microns, a third layer of aluminum foil adhered to the second layer of polyester material by an adhesive, the third layer of aluminum foil having a thickness in the range of from about 5 microns to about 50 microns, and a pressure sensitive adhesive layer disposed on the third layer of aluminum foil.

In yet another aspect of the invention, a covering for insulation is provided which includes multiple layers of a metal-containing foil and multiple layers of a puncture resistant, polymer film. The layers of puncture resistant polymer film are alternated with the layers of a metal-containing foil. The covering also includes a layer of a pressure sensitive adhesive disposed on one side of the covering, and on the other, exposed side of the covering, a layer of material resistant to ultraviolet radiation, acid rain, and salt. The covering is sufficiently flexible that it may be conformed to the shape of an insulated pipe.

In another aspect, a method for protecting insulation from damage due to moisture and other environmental factors is disclosed. This method includes the step of providing a covering material having a metal-containing layer on one surface and a layer of a pressure sensitive adhesive on a second surface, as well as a layer of a puncture resistant material disposed between the metal-containing layer and the adhesive layer, cutting the covering manually at a job site to form a first sheet, removing the release liner covering the pressure sensitive adhesive on the first sheet, applying the first sheet to the insulation so that the adhesive layer bonds to the insulation and the metal-containing layer is exposed, and applying additional sheets of covering material directly to the insulation such that each sheet of covering material overlaps sheets of covering material directly adjacent thereto.

In one embodiment, the method is used for covering an insulated duct having a substantially rectangular cross-sectional shape. In this embodiment, the applying steps include applying the first sheet of covering material to a bottom wall so that at least a three inch portion extends upwardly along each sidewall, applying a cut sheet of covering material to each side wall of the insulated duct so that it overlaps the portion of the sheet along the bottom wall which extends upwardly along the side wall, and so that a portion of the sheet material along each side wall extends along the top wall, and applying a fourth sheet of covering material to the top wall to overlap the portions of the sheets along the side wall which extend along the top wall.

In another embodiment of the invention, where the pipe to be insulated has a curved portion, lengths of a pressure sensitive adhesive tape having a metal-containing foil layer and a puncture resistant polymer layer are wrapped about the sheets of covering material to conform the covering material to the configuration of the pipe.

BRIEF DESCRIPTION OF THE DRAWINGS

The objects, advantages and features of this invention will be more clearly appreciated from the following detailed description, when taken in conjunction with the accompanying drawings, in which.

DETAILED DESCRIPTION

Figure 1:
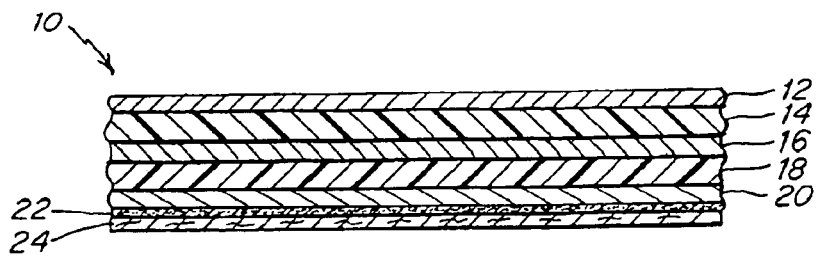
FIG. 1 is a cross-sectional view of a cutaway portion of one embodiment of the facing of this invention.

With reference now to the drawings, and more particularly to FIG. 1 thereof, one embodiment of the facing structure of this invention will be described. Facing 10 includes multiple layers of a metal or metalized foil and a puncture-resistant polymer film which are laminated together. The layers of foil provide the desired vapor seal, weather resistance, and a desirable exterior appearance. The layers of polymer provide puncture and tear resistance, particularly with respect to birds and other animals. All of the materials together provide the desired fire resistance and resistance to flame spread.

The number of layers of foil and polymer, the thickness of each layer, and the actual materials forming the layers are chosen to provide a facing which optimizes each of the desired properties. For example, thick layers of metal would provide additional resistance to weathering, impermeability to moisture, resistance to puncture, and additional strength. However, if the metal layers become too thick, they cannot be easily cut and manually applied at the job site. The material also could become too heavy to be easily manipulated, conformed and applied by the average worker. Similarly; additional layers of a polymer film, or greater thicknesses of polymer film would increase the puncture resistance of the facing but could also increase the weight, reduce the conformability and render cutting more difficult, thus making it very difficult to apply at the job site and to conform it to the shape of the fluid conduits about which it is to be wrapped. Any failure to conform the facing closely to the shape of the insulation surrounding the conduit could produce gaps through which moisture or wind could enter, thus destroying the weather and vapor seal and permitting the damage to the insulation it is designed to prevent. Different materials also provide different advantages. For example, steel provides greater strength and puncture resistance, while aluminum is lighter in weight, cheaper, more easily cut and more flexible. A metalized foil is lighter in weight than most metal foils, but generally is not as strong or as impermeable to moisture. Polytetrafluoroethylene (PTFE) is water proof, but is hard to cut and expensive. Polyester is cheaper and easier to cut and use than PTFE.

The embodiment illustrated in FIG. 1 represents a consideration of all of these factors and a balancing of the desired properties to achieve an optimal result. This embodiment includes a first layer 12 of a metal-containing foil, a layer 14 of a polymer film, another layer 16 of a metal-containing foil, another layer 18 of a polymer film, and a third layer 20 of a metal-containing foil. A pressure sensitive adhesive layer 22 is disposed adjacent foil layer 20. Prior to application, pressure sensitive adhesive layer 22 is covered by a release liner 24.

Layers 12, 16 and 20 typically are formed either of a metalized foil or of a metal foil. In one embodiment, layers 12, 16 and 20 are formed of an aluminum foil. It is understood however, that other metal foils could be used for layers 12, 16 and 20, such as a stainless steel foil, a titanium foil, a copper foil, or the like. In another embodiment, foil layers 12, 16 and 20 are formed of a metalized foil. Metalized foils suitable for use in this invention include conventional, commercially available foils in which a metal, such as aluminum, steel or titanium, is vapor deposited on a substrate formed of a polymer, such as polyvinyl fluoride (sold under the name TEDLAR®), polyethylene or biaxially oriented polypropylene. Since metalized foils tend to have pin holes resulting from handling during manufacture or other causes, it is preferred that not all of layers 12, 16 and 20 be formed of a metalized foil. Preferably, at least one of layers 12, 16 and 20 is formed of a metal foil, such as aluminum. In a preferred embodiment, at least layer 12 is formed of a metal foil, although it is understood that layer 12 could be formed of a metalized foil, so long as one of layers 16 and 20 is formed of a metal foil. If only one of layers 12, 16 and 20 is formed of a metal foil, it is preferred that such a layer have a thickness of at least nine microns to provide the desired impermeability to moisture. If more than one of layers 12, 16 and 20 is formed of a metal foil, it is preferred that the total thickness of metal foil layers in facing 10 be at least nine microns, and more preferably 25 microns.

Layers 14 and 18 typically are formed of a polyester film although other polymer films such as polypropylene, polyethylene, polyurethane, Nylon®, Dacron®, Kevlar®, or polytetrafluoroethylene could be used.

Layers 12, 14, ,16, 18 and 20 preferably are laminated or bonded together such as by an adhesive. This laminating adhesive could be a pressure sensitive adhesive or any conventional, flame retardant adhesive which is suitable for laminating a metal foil to a polymer, and which has high strength and durability. In one embodiment, a conventional urethane laminating adhesive is used, such as that, sold under the name Boscadur and purchased from the Bostik Chemical Division of the Emhart Fastener Group in Middleton, Mass. 01949. Another adhesive is sold under the name Adcote by Rohr & Haas. Typically, these laminating adhesives are provided in layers of about 0.3 to 2.0 mils and coating weights of about 3 to 11 pounds per 1000 square feet.

Layer 22 of a pressure sensitive adhesive can be any commercially available, pressure sensitive adhesive that is suitable for bonding to a metal or metalized foil and to kraft paper or other insulation surfaces, and which maintains its integrity under low and high temperature conditions. Examples of such suitable pressure sensitive adhesives are disclosed in U.S. Pat. No. 4,780,347, which is specifically incorporated herein by reference. In particular, one suitable adhesive is a pressure sensitive, acrylic adhesive, which when cured, approaches a 100% acrylic compound in which substantially all solvents have been removed. This adhesive can, however, tolerate up to 1% solvents after curing and still perform as desired. When cured, layer 22 formed of this particular acrylic adhesive typically has a thickness of between about 1.0 and 5 mils and a coating weight of about 5.5 to about 27.5 pounds per 1000 square feet. This particular acrylic adhesive is especially desirable, since it remains tacky and useable at temperatures as low as minus 17° Fahrenheit and as high as 284° Fahrenheit.

Release liner 24 can be any conventional release liner suitable for use with an acrylic adhesive. A typical release liner is a silicone coated, natural kraft paper release liner rated at 70 pounds per ream.

In one embodiment, where foil layers 12, 16 and 20 are formed of a metal foil, each layer 12, 16 and 20 is about 9 microns in thickness. However, especially for aluminum foils, thicknesses as low as 5 microns also would be suitable for many applications, while thickness as great as 50 microns would be acceptable, since facing 10 would still be cuttable with a knife or scissors and would still be sufficiently conformable to be used in covering most types of installations in most applications.

In one embodiment, layers 14 and 18 may be about 23 microns or greater in thickness. However, it is to be understood that layers 14 and 18 could be thinner than 23 microns, depending upon the degree of puncture and tear resistance desired. In fact, layers 14 and 18 could be as thin as 5 microns for certain applications. In addition, these layers 14 and 18 may also be as thick as 50 microns so long as the resulting facing 10 is still adequately conformable to the shape of the fluid conduit and the insulation surrounding it, and the facing 10 could still be cut with scissors or a knife. Preferably, the total thickness of facing 10 is 100 microns or less to allow it to be easily cut and handled at the job site. If the facing could be precut at the factory prior to transportation to the job site, much thicker layers of polymer and foil could be utilized to provide enhanced performance as long as the material still conformed to the outer shape of the insulation-covered conduit.

In one embodiment in which layers 12, 16 and 20 are formed of an aluminum foil having a thickness of about 9 microns, and in which layers 14 and 18 are formed of a polyester film having a thickness of about 23 microns, the total thickness of facing 10, not including adhesive layer 22, is about 85 microns. This thickness includes the thicknesses of the laminating adhesives used to bond together the layers. In this embodiment, a typically thickness of adhesive layer 22 is about 0.079 millimeters with a coating weight of about 50 grams per square meter. The peel adhesion is about 30 ounces per inch and the sheer adhesion is indefinite at 2.2 pounds per square inch. The tensile strength measured according to PSTC-31 is about 50 pounds per inch width. The elongation at break is at about 166%. The puncture resistance according to ASTM D-1000 is about 16 kilograms, while the tear strength according to ASTM D-624 is about 2 kilograms. A maximum temperature for continuous use is about 300° Fahrenheit (149° C.), and the application temperature ranges from minus 17° Fahrenheit to 284° Fahrenheit (minus 27° C. to plus 140° C.). Facing 10 has no permeability to water vapor. Facing 10 has a chemical and ultraviolet resistance which is comparable to that of aluminum.

Figure 1A:
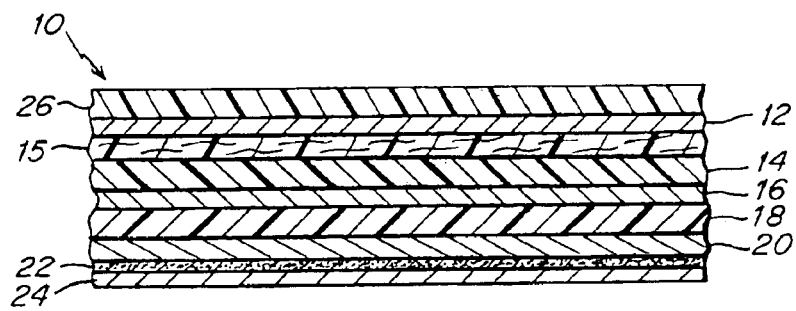
FIG. 1A is a cross-sectional view of a cutaway portion of another embodiment of the facing of this invention.
Figure 1B:
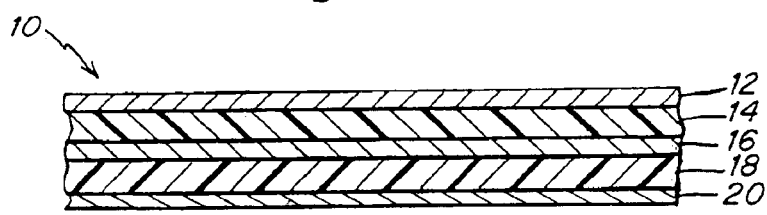
FIG. 1B is a cross-sectional view of a cutaway portion of yet another embodiment of the facing of this invention.

FIGS. 1A and 1B illustrate other embodiment of the facing 10 of this invention. Like numbers are used for like parts, where appropriate. In FIG. 1A, a protective layer 26 is disposed on top of layer 12 of facing 10. Protective layer 26 protects layer 12, and thus all of the layers below layer 12 from damage caused by the environment. Preferably, protective layer 26 protects against damage due to ultraviolet radiation, and/or acid rain, and/or salt and/or other corrosive materials found in the environment. In one embodiment, protective layer 26 is a cured epoxy coating which is deposited on layer 12 while wet and allowed to cure. Other materials which could be used for layer 26 include a urethane material, polyvinyl fluoride, an acrylic material, a metalized film of polyvinyl fluoride, a metalized titanium film, a layer of silica vapor deposited upon layer 12 or layer of Saran®.

In another embodiment, as illustrated in FIG. 1B, facing 10 could be provided without adhesive layer 22 or release liner 24. In the absence of adhesive layer 22, a user could apply facing 10 directly to insulation at the factory prior to shipment to a job site. In such an instance, the facing 10 could be applied utilizing a conventional hot melt adhesive, or any other standard adhesive. If facing 10 of FIG. 1B is sent directly to the job site, the user could apply facing 10 to the insulation utilizing a mastic, or conventional adhesive, which is either applied to layer 20, or which is applied to the insulation prior to application of the facing 10.

Another alternative embodiment of the structure of FIG. 1 is illustrated in FIG. 1A in which an additional layer 15 is incorporated into the structure of FIG. 1 between a layer 12 of a metal-containing foil and a layer 14 of polymer film. This additional layer 15 can be incorporated-between any two layers in the structure, but typically is not disposed on an outside surface, or adjacent adhesive layer 22. This layer could be formed of a fiberglass scrim, a polyester scrim, a woven fabric or a fiberglass and a polyester scrim. The woven fabric could be formed of a polypropylene or a polyester thread. Such a layer 15 provides additional tensile strength, and tear resistance. In addition, a scrim layer produces a pattern on the exterior surface of facing 10 that is rectangular in shape, and that aids the installer in properly aligning the facing 10 on the insulation.

Moreover, additional layers of a metal-containing foil and a polymer could be added to the structure of FIG. 1 so long as the resulting product were sufficiently conformable, easy to cut and lightweight. Additional layers could be accommodated by making thinner the alternating metal-containing layers and polymer layers. In addition, it is to be understood that layer 22 of a pressure sensitive adhesive could be applied to polymer layer 18 rather than to a metal-containing layer, as illustrated in FIG. 1.

Methods of use of facing 10 in various applications will now be described with reference to FIGS. 2–7. Before applying the facing 10 to any surface, it is important that the surface be dry, clean and free from dust, oil and grease or silicone. Facing 10 should be cut to size prior to application. Typically, cutting to size is performed at the jobsite so that the worker can measure the fluid conduit or duct work on the spot and cut the facing to the precise size desired. However, facing 10 could be precut at the factory, particularly for the portions used on curved pipes, as shown in FIG. 4, or on T-sections, as shown in FIG. 7. Typically, facing 10 comes in large rolls which are unrolled and then cut with scissors, knives, box cutters or the like. It is important that the sheets of facing 10 be applied in an overlapping fashion, to provide a weather and vapor proof seal. A three inch (75 millimeter) overlap is recommended. When applying sheets of the facing 10, typically release liner 24 is peeled back from one edge and creased to expose adhesive layer 22 along that edge. This edge is then adhered to the surface to which the facing is to be applied, and thereafter, release liner 24 is peeled away from adhesive layer 22 as the facing is applied, such as by use of a spreader which smoothes the facing and the insulation surface.

Figure 2:
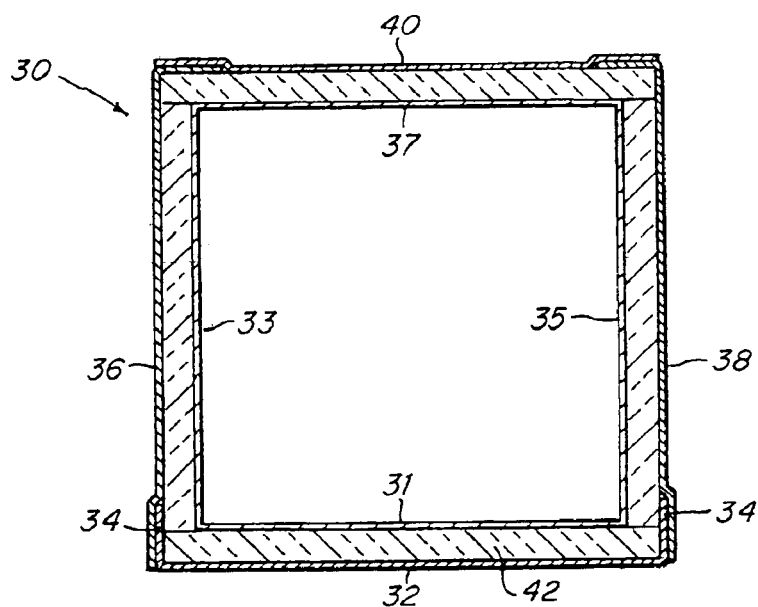
FIG. 2 is a cross sectional schematic view of rectangular duct work illustrating a method for applying the facing of FIG. 1 to duct work.

One method for applying a sheet of facing 10 to rectangular duct work 30 is illustrated in FIG. 2. Typically, a sheet 32 of facing 10 is first applied to the insulation 42 on the bottom wall 31 of the duct 30 and the necessary overlap 34 is provided along walls 33 and 35. Typically, one edge of sheet 32 is first adhered to insulation on wall 33 or 35 to provide overlap 34, while the remainder of the sheet 32 remains covered by release liner 24. As sheet 32 is secured to insulation on wall 31, release liner 24 is peeled away from adhesive layer 22 just prior to adhering sheet 32 to insulation on wall 31. The process continues until all of the insulation on wall 31 is covered, and the necessary overlap 34 is provided along the other of wall 33 or 35. Thereafter, another sheet 36 or 38 of facing is applied along respective wall 33 or 35. In both instances, the overlap 34 typically is provided along wall 37. Once insulation on walls 33 and 35 has been covered, insulation on top wall 37 is covered in the manner previously described with sheet 40. Sheet 40 need not overlap walls 33 and 35. Typically, no additional sealing tape is required for such rectangular duct work 30, or the like. This process is repeated along the entire axial or longitudinal length of the duct work 30 with additional sheets of facing 10 that overlap adjacent sheets in a longitudinal direction along circumferentially extending edges. This technique is particularly advantageous for large, flat horizontal ductwork upon the top wall 37 of which water tends to pool. By using a sheet on the top wall 37 that extends the width of the wall and overlaps walls 33 and 35, there are no seams into which the pooled water may seep.

Figure 3:
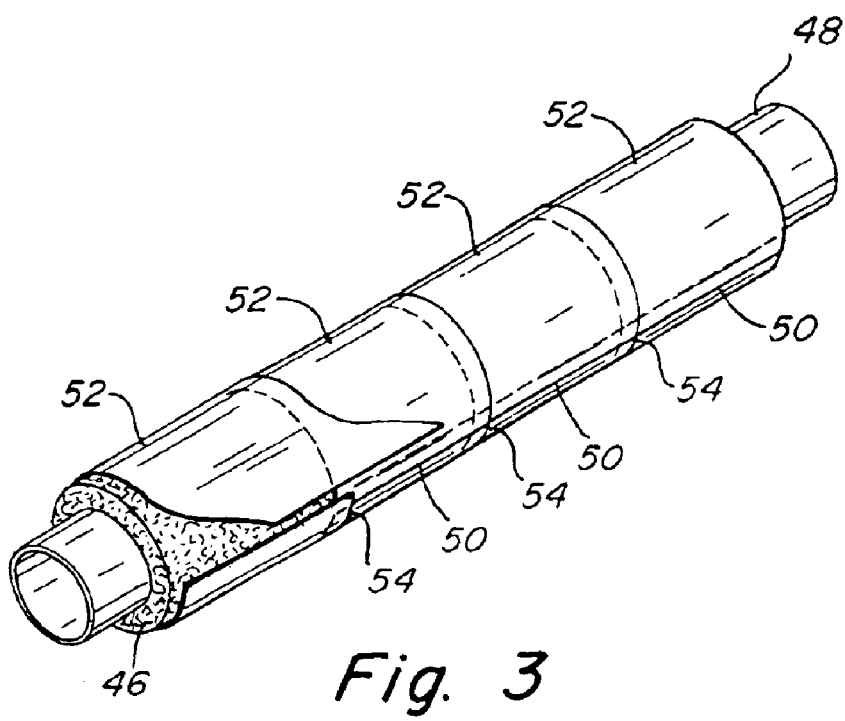
FIG. 3 is a perspective schematic view illustrating a method for applying the facing of FIG. 1 to a cylindrical, straight pipe.
Figure 4:
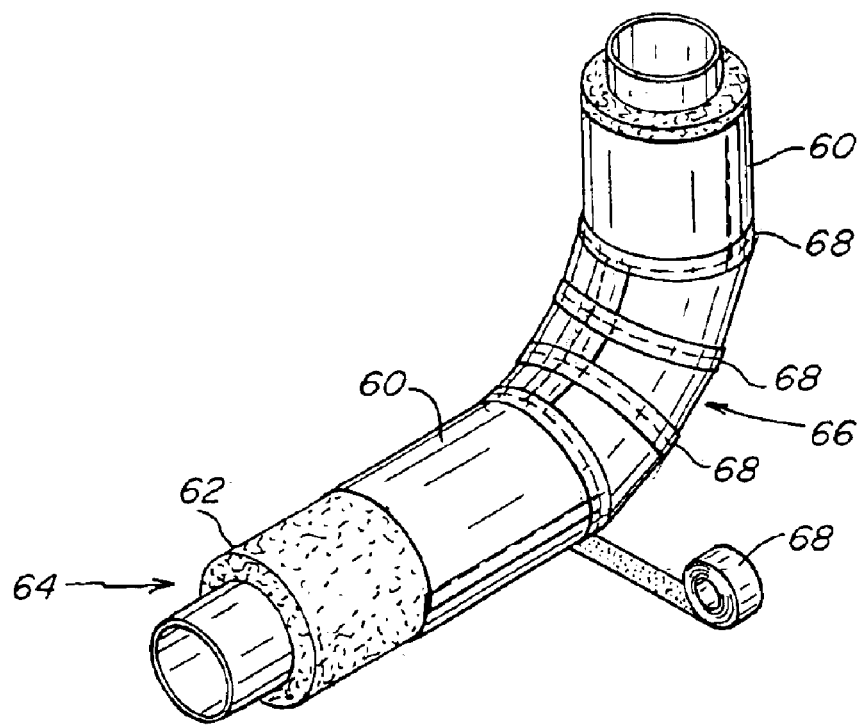
FIG. 4 is a perspective, schematic view illustrating a method for applying the facing of FIG. 1 to a curved pipe.

An example of a method of application of this facing 10 to a straight circular pipe 48 is illustrated in FIG. 3. In this example, a series of sheets 52 having the same width and length are cut from rolls of the facing 10 prior to installation. Each sheet 52 is sized so that when wrapped about the insulation 46 on pipe 48, a suitable circumferential overlap 50 results along axially extending edges. Similarly, when successive sheets 52 are applied, there should be an overlap 54 between each successive sheet 52 in an axial direction along circumferentially extending adjacent edges. Each sheet 52 is otherwise applied in the same manner as described with respect to FIG. 2.

FIG. 4 illustrates one example of application of facing to a curved pipe 64. Initially, sheets 60 are applied in a manner virtually identical to sheets 52 of FIG. 3. Successive sheets 60 are cut and applied in an overlapping manner to insulation 62 along the axial length of pipe 64. One difference between the method of FIG. 3 and that of FIG. 4 is that the sheet 60 applied to the curved portion 66 of pipe 64 typically would be narrower in width in an axial direction than sheets 60 covering the straight portion of the pipe 64, since facing 10 may not conform as easily to the shape of the curved portion 66 of the pipe 64 as it does to the straight portions because of a slight inherent rigidity caused by the multiple layers of foil and polymer.

Figure 8:
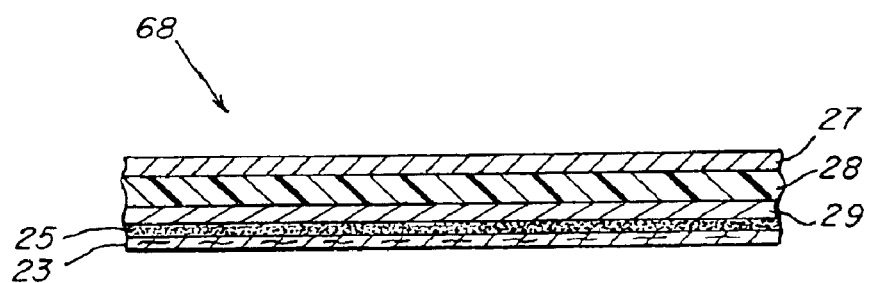
FIG. 8 is a cross-sectional view of a cutaway portion of a wrapping tape to be used in the method of this invention.

To assist in conforming sheet 60 to the shape of the curved portion 66 of the pipe 64, in some applications, it may be desirable to apply a wrapping of a tape 68 at axially spaced intervals, as shown. Tape 68 typically is wrapped so as to overlap itself circumferentially and should be applied at whatever axial intervals are necessary to conform sheet 60 to the shape of curved portion 66. A tape 68 typically used for this purpose is a tape which has the same vapor barrier, weathering characteristics, and appearance as facing 10. In one example, as shown in FIG. 8, tape 68 is formed of a film 28 of a polymer disposed between two layers 27 and 29 of a metal-containing foil. The layers are laminated together using a laminating adhesive, like that used for facing 10. Like layers 12, 16 and 20 of facing 10, layers 27 and 29 could be formed of a metalized foil or a metal such as aluminum, while the polymer film 28 can be formed of the same materials as layers 14 and 18 of facing 10, such as polyester. Layers 27 and 29 and polymer film 28 could be of the same construction and thickness as respective layers 12 and 14 found in facing 10. Typically, a pressure sensitive adhesive layer 25, similar to adhesive layer 22, is disposed on layer 29, and a release liner 23, such as release liner 24 is applied to the layer 25 of pressure sensitive adhesive.

Figure 5:
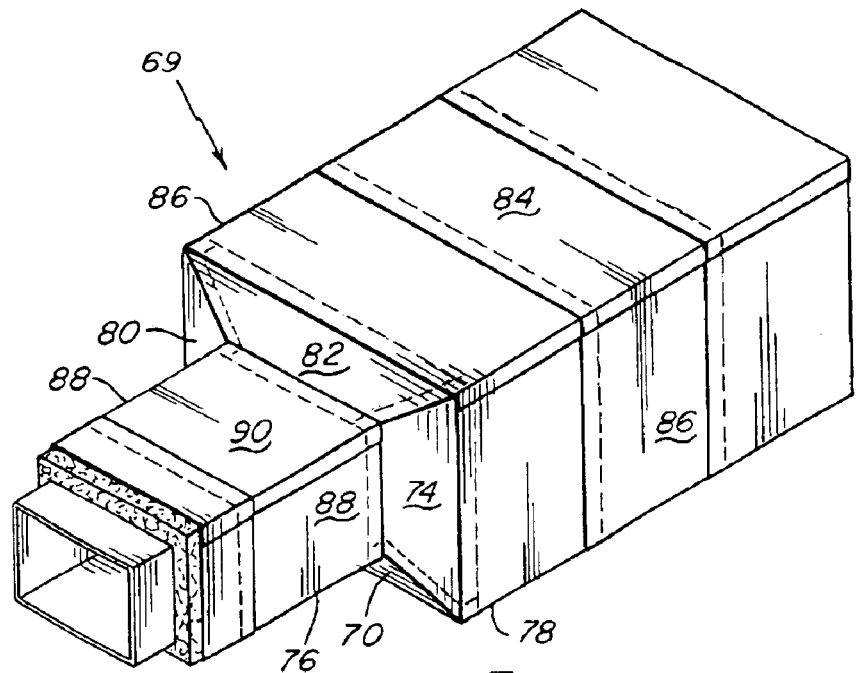
FIG. 5 is a perspective, schematic view illustrating a method for applying the facing of FIG. 1 to a reduced portion of rectangular duct work.

FIG. 5 illustrates one example of the application of facing 10 to a reduced section of duct work 69. A first trapezoidal segment of facing is cut and applied to surface 70. This trapezoidal segment should provide the desired overlap on each adjoining surface, including surfaces 74, 76, 78 and 80. Next, trapezoidal segments of facing are cut for surfaces 74 and 80, providing the necessary overlap along adjoining surfaces 70, 86, 88 and 82. Thereafter, a final trapezoidal segment of facing is cut and applied to surface 82 with overlap provided along surfaces 90, 84, 80 and 74. Next, sheets are cut having the necessary circumferential length to be wrapped about surfaces 76, 88 and 90 with the necessary axial overlap along circumferential edges as well as with the necessary overlap with each of the trapezoidal segments on surfaces 70, 80, 82 and 74 and adjacent sheets in an axial direction along circumferentially extending edges. Finally, sheets of facing are cut to be wrapped about surfaces 78, 84 and 86 to provide the necessary overlap with the trapezoidal segments on surfaces 80, 82, 74 and 70, with adjoining sheets in an axial direction along surfaces 84, 86 and 78, and with themselves in an axial direction along circumferentially extending edges. Each sheet is applied as previously described.

Figure 6A:
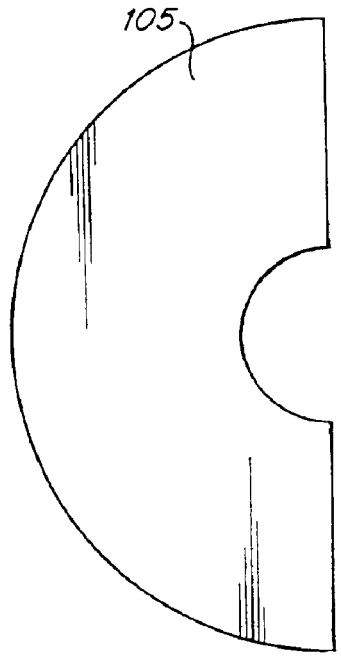
FIG. 6A is a plan view of a precut facing segment to be applied to a tapered portion of a reduced pipe.
Figure 6:
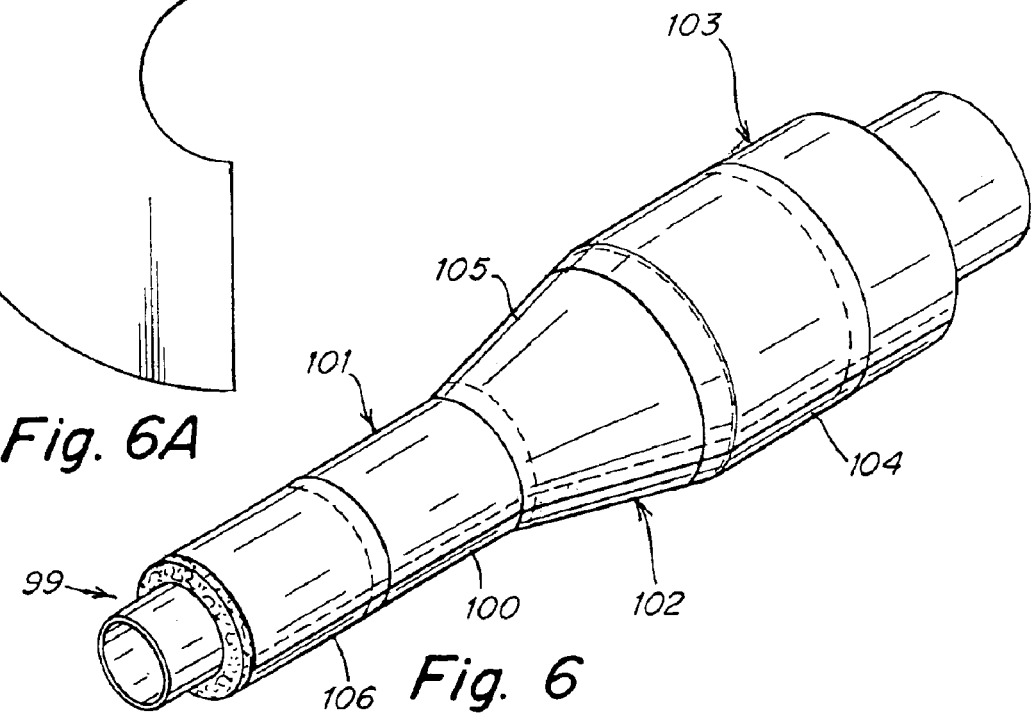
FIG. 6 is a perspective, schematic view illustrating a method for applying the facing of FIG. 1 to a reduced pipe.

FIG. 6 illustrates one example of the application of facing 10 to a reduced pipe 99. Typically, a sheet of facing is first applied to surface 100 which is the reduced portion 101 of the pipe 99 just adjacent the tapered portion 102. A sheet of facing is cut and wrapped about surface 100 in the manner previously described. Thereafter, a C-shaped section 105 of facing (see FIG. 6A) is cut and applied to the tapered portion 102, providing overlap with the material on surface 100. Sheets of facing 10 then are cut and applied to surface 104 of the enlarged portion 103 of the pipe 99. These sheets are applied one adjacent another along the length of surface 104 so as to provide overlap with each other in an axial direction and to provide overlap with themselves as shown in a circumferential direction. Finally, sheets of facing are applied to surface 106 in overlapping relationship with one another along the axial length, and with themselves in a circumferential direction, as previously described.

Figure 7A:
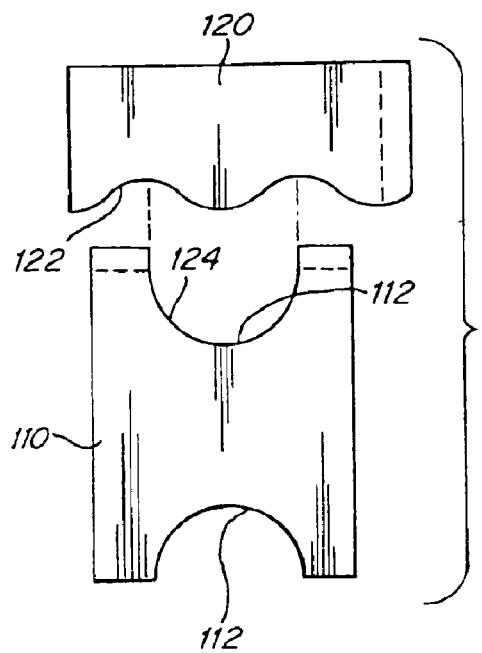
FIG. 7A is a plan view of precut facing segments to be applied to a T-section pipe.
Figure 7:
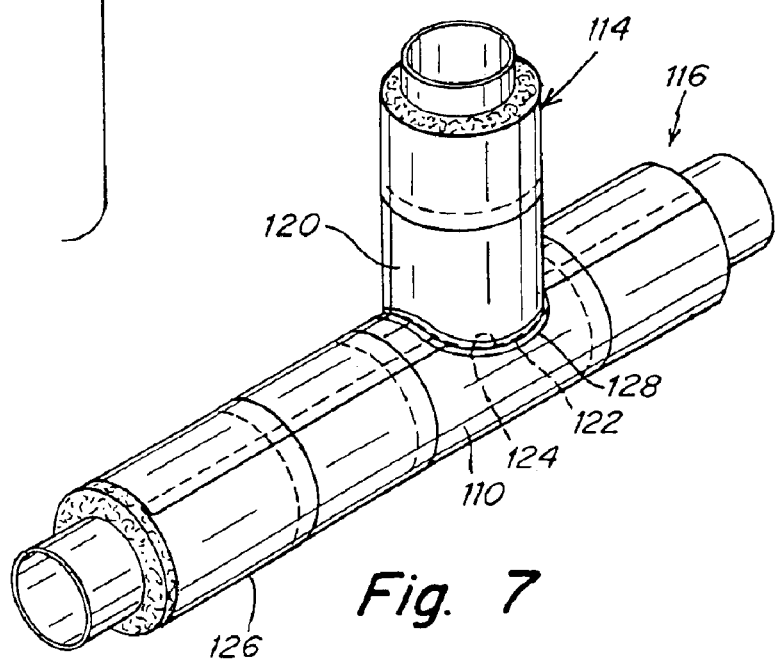
FIG. 7 is a perspective schematic view illustrating a method for applying the facing of FIG. 1 to a T-section pipe.

FIGS. 7 and 7A illustrate one example of the application of facing 10 to a T section of a pipe 116. A first sheet 110 is cut having the configuration shown in FIG. 7A. Sheet 110 is provided with cutouts 112 to accommodate the T section 114 of pipe 116. Thereafter, a sheet 120 is cut to the shape shown in FIG. 7A. Sheet 120 is then applied to section 114 in the manner shown, so that there is overlap between edge 122 of sheet 120 and edge 124 on sheet 110. Thereafter, additional overlapping sheets may be applied to segment 114, as well as to portion 126, as previously described with respect to a straight pipe in FIG. 3. Preferably a length of tape 128, like tape 68, is applied at the junction of edges 122 and 124 to effect a vapor tight seal.

The facing 10 of this invention, when used with insulation for a fluid conduit, such as a pipe or duct work, provides a vapor tight seal about the insulation and duct work or pipe that is weather resistant, puncture and tear resistant, sufficiently flexible, easily cut, and aesthetically pleasing. Facing 10 can be applied in almost all weather conditions, and in a temperature range from minus 17° to plus 284° Fahrenheit. The resulting sealed pipe or duct work is fire resistant, and any flame would spread very slowly. Facing 10 can be easily repaired onsite, and has a long life.

The method of this invention provides an easy technique for applying facing to insulation disposed on duct work or on pipes and can be mastered with very little training or skill. Installation is fast, clean and safe. Only scissors and a knife or the like are required as tools, and all work can be done at the job site. No prior or cuffing or assembly is required.

Modifications and improvements will occur within the scope of this invention to those skilled in the art. The above description is intended as exemplary only, the scope of this invention being defined by the following claims and their equivalents.

What is claimed is:

1. A method for protecting insulation from damage due to moisture and other environmental factors, said method comprising:

providing a covering material having a metal-containing layer on one surface and a layer of a pressure sensitive adhesive on a second, opposite surface, said covering material including at least one layer of a puncture resistant material disposed between the metal-containing layer and the adhesive layer;

manually cutting from the covering material an appropriately sized first sheet at a job site;

removing a release liner covering the pressure sensitive adhesive layer of the first sheet;

applying the first sheet to the insulation so that the adhesive layer bonds to the insulation and the metal-containing layer is exposed cutting additional sheets of said covering material; and applying said addtional sheets of covering material directly to the insulation such that each sheet of covering material overlaps sheets of covering material directly adjacent thereto.

2. The method as recited in claim 1 wherein said manually cutting step comprises cutting the covering material into sheets having shapes that conform to an external shape and size of the insulation being covered.

3. The method as recited in claim 1 further comprising, for a pipe having a curved portion with said sheets of covering material and said insulation, wrapping lengths of a pressure sensitive adhesive tape having a layer of a metal-containing foil and a layer of a puncture resistant polymer about the sheets of covering material to conform the covering material and the insulation to the configuration of the pipe.

4. The method as recited in claim 1 further comprising sealing seams between adjacent sheets of covering material with a pressure sensitive adhesive tape.

5. The method as recited in claim 1 wherein the metal-containing layer is an aluminum foil the covering material is formed of a laminate of aluminum foil.

6. The method as recited in claim 1 wherein for an insulated duct having a substantially rectangular cross-sectional shape, the first and second applying steps comprise:

applying the first sheet of covering material to a bottom wall of the duct so that an overlapping portion of the sheet extends upwardly along each side wall of the insulated duct immediately adjoining the bottom wall;

thereafter applying a cut sheet of covering material to each side wall of the insulated duct so that each sheet on the side wall overlaps the overlapping portion of the first sheet extending upwardly from the bottom wall and so that another overlapping portion of each sidewall sheet of material extends beyond the side wall and along the top wall of the insulated duct; and applying a fourth sheet of a covering material to the top wall of the duct to overlap the overlapping portions of the sheets of material on the side wall which extend along the top wall.

* * * * *

UNITED STATES PATENT AND TRADEMARK OFFICE
CERTIFICATE OF CORRECTION

| | | |
|---|---|---|
| PATENT NO. | : 6,953,512 B2 | Page 1 of 1 |
| APPLICATION NO. | : 11/040037 | |
| DATED | : October 11, 2005 | |
| INVENTOR(S) | : Lewis S. Cohen et al. | |

It is certified that error appears in the above-identified patent and that said Letters Patent is hereby corrected as shown below:

Column 11, lines 9-11, cancel the text beginning with "5. The method as recited" to and ending "a laminate of aluminum foil.", and insert the following claim:

-- 5.   The method as recited in claim 1 wherein the metal-containing layer is an aluminum foil; the puncture resistant film is polyester; and the covering material is formed of a laminate of aluminum foil and polyester film in multiple alternating layers. --

Signed and Sealed this

Thirteenth Day of October, 2009

David J. Kappos
*Director of the United States Patent and Trademark Office*